Figure 1:
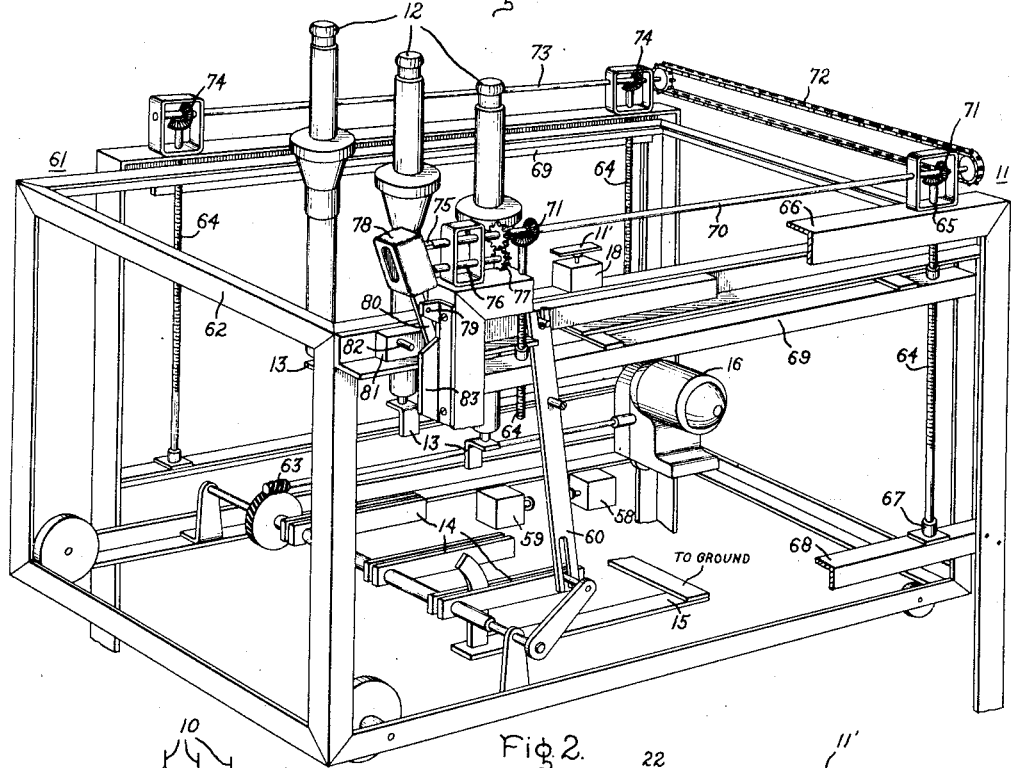

July 11, 1944.  W. SPECHT  2,353,518

ELECTRICAL APPARATUS

Filed Oct. 2, 1940

Inventor:
Woldemar Specht,
by Harry E. Dunham
His Attorney.

Patented July 11, 1944

2,353,518

UNITED STATES PATENT OFFICE 2,353,518

ELECTRICAL APPARATUS

Woldemar Specht, Philadelphia, Pa., assignor to General Electric Company, a corporation of New York Application October 2, 1940, Serial No. 359,398

4 Claims. (Cl. 175—183)

My invention relates to electrical apparatus and more particularly to combined test and grounding means for testing and grounding high-voltage circuits, such as main buses, feeder connections, and the like.

In order to make repairs on high-voltage electric circuits and apparatus associated therewith, it is, of course, necessary to ground the high-tension circuits to insure the safety of workmen working either on these circuits or associated apparatus. In grounding such circuits, it is important to compel the operator to test the circuit before attempting to ground the same in order to make sure that it is unenergized and, furthermore, that the circuit which has been tested is thereafter grounded. Conditions have arisen where an operator tested high-tension electrical circuits, such as main buses or feeder lines, found that they were unenergized, and then proceeded to ground a different circuit which was energized, resulting in loss of life as well as destruction of property. In order to eliminate this danger of grounding an energized high-tension electrical circuit with the consequent destruction of life and property, it would be desirable to provide an arrangement which would require testing of the electrical circuits before grounding and prevent such grounding unless the circuits were unenergized. Furthermore, the arrangement should require that only the tested unenergized circuit could be grounded. My invention is particularly applicable to metal-clad switchgear whether of the vertical lift type or the horizontal draw-out type. In connection with such switchgear, grounding arrangements have been provided which are associated with the removable circuit breaker itself, by providing auxiliary contacts and connections which are made when the circuit breaker is in the open position, the breaker being subsequently closed to effect the grounding connection. Arrangements of this type, however, involve the danger of breaking the grounding connection in the event that the circuit breaker is tripped and, furthermore, do not provide foolproof means for eliminating the dangers referred to above.

Accordingly, it is an object of my invention to provide an improved testing and grounding apparatus for high-tension circuits which is simple and rugged in construction and foolproof in operation so as to reduce the possibility of danger either to life or property.

It is another object of my invention to provide an improved combined test and grounding device for electrical circuits which will prevent the grounding of these circuits when they are energized and which will provide a greater measure of safety than arrangements known heretofore.

Still another object of my invention is to provide an improved testing and grounding device for metal-clad switchgear of the type including a stationary structure for housing the main bus bars and feeder connections and a switch unit removable with respect thereto wherein the grounding connection cannot be broken accidentally and also which may be controlled from a remote position.

Further objects and advantages of my invention will become apparent as the following description proceeds and the features of novelty which characterize my invention will be pointed out with particularity in the claims annexed to and forming a part of this specification.

Figure 2:
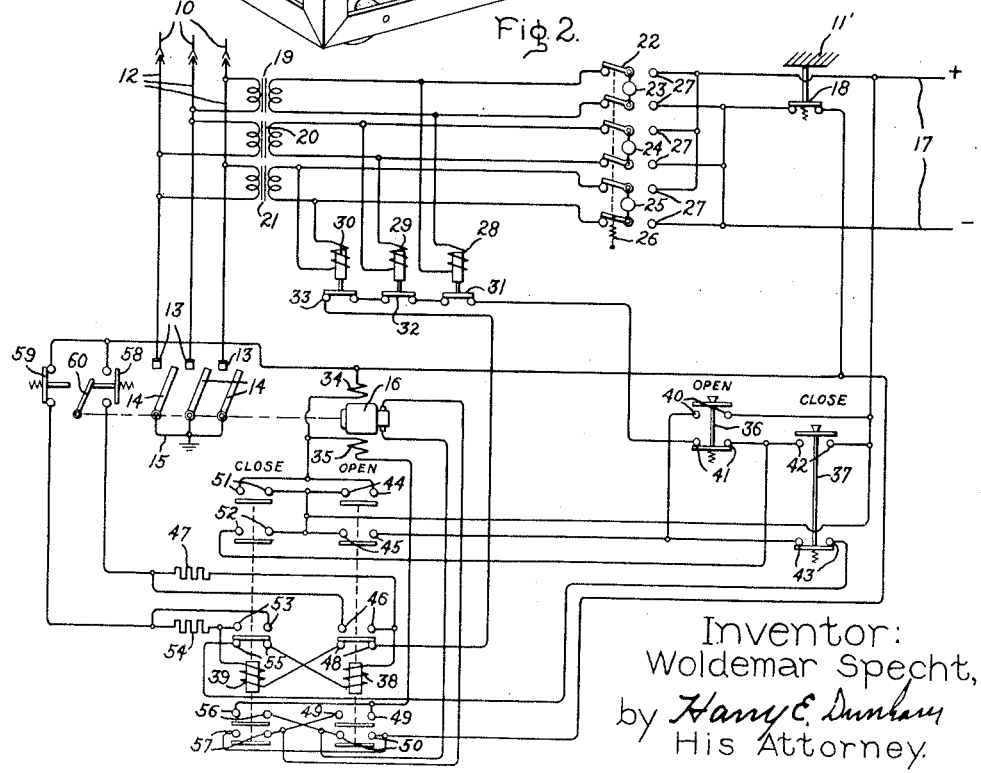

For a better understanding of my invention, reference may be had to the accompanying drawing in which Fig. 1 is a perspective view of a specific apparatus embodying the combined testing and grounding equipment of my invention, and Fig. 2 is a diagrammatic illustration of the control circuit and schematic representation of some of the apparatus of the combined testing and grounding equipment of Fig. 1.

In order to illustrate my invention, I have chosen in Fig. 1 to show its specific application to metal-clad switchgear of the so-called "vertical lift type" in which engagement and disengagement of the primary disconnecting contacts are obtained by vertical movement of the removable unit. It will, of course, be obvious to those skilled in the art that my invention is equally applicable for use in connection with metal-clad switchgear of the so-called "draw-out type" wherein engagement and disengagement of the primary disconnecting contacts are obtained by horizontal movement of the removable unit, or for use in other installations where a combined testing and grounding device is required.

Since metal-clad switchgear, in connection with which I have chosen to describe my invention, is very well known to those skilled in the art, only a brief mention thereof will be made hereinafter. Such switchgear generally comprises a stationary housing in which are mounted the stationary circuit and bus bar structures which are connected to the stationary portions of the primary disconnecting contacts also supported by this housing, and a removable unit including the circuit breaker and the movable portion of the primary disconnecting contacts.

Quite often the stationary housing also supports certain interlocking means and rack-out or elevating mechanisms to aid in the engagement and disengagement of the primary disconnecting contacts. Metal-clad switchgear of the vertical lift and draw-out types are disclosed and claimed, respectively, in United States Letters Patent 2,043,113, Paxton et al., granted June 2, 1936, and a copending application of Bertram W. Mahoney, Serial Number 321,673, filed March 1, 1940, and assigned to the same assignee as the present application.

The present invention consists in providing a separate testing and grounding unit which is inserted in the metal-clad switchgear in place of the removable unit, comprising the circuit breaker and the movable portion of the primary disconnecting contacts, whenever grounding of the circuits or a part thereof is to be effected for maintenance purposes and the like. In order to aid in the understanding of my invention, I will first describe it in connection with the schematic diagram of Fig. 2 before describing the structural details illustrated in Fig. 1. However, the corresponding parts of Figs. 1 and 2 are designated by the same reference numerals.

Referring now to Fig. 2, I have schematically illustrated the stationary portions 10 of the primary disconnecting contacts which are supported by the metal enclosed housing, generally indicated at 11 in Fig. 1 in a manner well understood by those skilled in the art. Only a small portion of the metal-enclosed housing 11 is shown in Fig. 1 since the particular construction of this housing forms no part of my invention and serves in so far as my invention is concerned merely to support the stationary portions 10 of the primary disconnecting contacts which are arranged to engage with cooperating contacts 12 mounted on the combined testing and grounding unit of my invention. I have chosen to illustrate the cooperating contacts 10 and 12 as comprising three phases but it will be obvious that my invention is equally applicable to any single-phase or polyphase arrangement. The cooperating contacts 12 arranged to engage with the stationary portions 10 of the primary disconnecting contacts supported by housing 11 (Fig. 1) are connected to the terminals 13 of a grounding switch 14 which is connected to ground through ground circuit 15. Grounding switch 14 is arranged to be operated by a suitable reversible motor 16, energized from a source of control potential 17 which in the instant case is illustrated as a direct-current source. Although I have illustrated an electric motor 16, it will be understood by those skilled in the art that a fluid motor or a pneumatic motor might equally well be used. The control circuit for motor 16 will be described in detail hereinafter.

As was mentioned above, it is desirable that the operator can only ground the line which he has tested and, accordingly, it is essential that the testing of the line must precede the grounding. To accomplish this, I provide a suitable normally open limit switch 18 connected in the control circuit of motor 16 so that motor 16 cannot be energized to operate grounding switch 14 until limit switch 18 is closed. As shown in Fig. 1, limit switch 18 is mounted at the top of the combined test and grounding unit and is arranged to be closed when it engages the portion 11' of the metal housing generally indicated as 11. Limit switch 18 is also so positioned that it is not closed until cooperating contacts 12 of the combined testing and grounding unit have engaged the stationary portions 10 of the primary disconnecting contacts. It will, of course, be obvious to those skilled in the art that, if the combined test and grounding unit were to be used with metal-clad switchgear of the draw-out type as contrasted with the vertical lift type disclosed in Fig. 1, limit switch 18 would be placed at the rear of the removable testing and grounding unit so as to be closed upon the engagement of horizontally positioned contacts similar to 10 and 12. As will be described in greater detail hereinafter, engagement of contacts 10 and 12 or disengagement thereof cannot be accomplished unless grounding switch 14 is open.

As soon as contacts 10 and 12 have been engaged, a plurality of potential transformers 19, 20, and 21, having the primary windings thereof connected across the respective phases associated with contacts 10 and 12, will be energized if the circuits associated with contacts 10 are alive. In order to inform the operator that the circuit to be grounded is alive, the secondary windings of potential transformers 19, 20, and 21 are normally connected through a six-pole double-throw test switch 22 to suitable signal lamps 23, 24, and 25. Test switch 22 is biased by means of spring 26 to connect lamps 23, 24, and 25 across the secondary windings of potential transformers 19, 20, and 21, respectively. Furthermore, spring means 26 is arranged to return test switch 22 to the position shown in Fig. 2 after it has been opened for any reason by the operator. If there is no potential on the circuits associated with the stationary portions 10 of the primary disconnecting contacts, the signal lamps 23, 24, and 25 will not glow. In order to make sure that the absence of glow from lamps 23, 24, and 25 is not due to faulty lamps, the double-throw feature of test switch 22 is provided, whereby the lamps may be connected across the control source of power 17 through test contacts 27. If the operator moves test switch 22 so that contacts 27 are engaged thereby, the signal lamps 23, 24, and 25 should light up if they are in good condition, whereupon the operator will be informed that, if the lamps do not glow when test switch 22 is returned to its spring-biased position, there is no potential on the circuit to be grounded and, hence, it is safe to perform the grounding operation.

In the event that the operator should disregard the indication of signal lamps 23, 24, and 25, showing that the circuit to be grounded is alive, and try to close motor-operated grounding switch 14, he would find it impossible because of the fact that I have provided three potential relays 28, 29, and 30, connected across the secondary windings of potential transformers 19, 20, and 21, respectively. These potential relays 28, 29, and 30 have their contacts 31, 32, and 33, respectively, connected in series in the control circuit of motor 16, which cannot be operated unless all three of these relays are unenergized, indicating no potential on the circuit to be grounded.

The control circuit for motor 16 illustrated as a direct-current motor with a shunt field 34 and a series field 35 comprises an opening push button or switch 36, a closing push button or switch 37, an opening contactor generally indicated at 38, and a closing contactor generally indicated at 39. Opening push button 36 is provided with a pair of normally open contacts 40 and a pair of normally closed contacts 41, while closing push button 37 is provided with a pair of normally open contacts 42 and normally closed contacts 43. It will be understood by those skilled in the art that opening and closing push buttons 36 and 37 are preferably arranged so that the operation of motor 16 and consequently grounding switch 14 may be controlled from a remote position.

Each of the opening and closing contactors 38 and 39 controls a plurality of normally open contacts and a normally closed contact as follows: Opening contactor 38 is arranged to control normally open contacts 44, normally open opening seal-in contacts 45, normally open contacts 46 adapted to shunt opening starting resistor 47, normally closed interlock contacts 48, and normally open contacts 49 and 50. Similarly closing contactor 39 is arranged to control normally open contacts 51, normally open closing seal-in contacts 52, normally open contacts 53 adapted to shunt closing starting resistor 54, normally closed interlock contacts 55, and normally open contacts 56 and 57. In order to stop motor 16 when grounding switch 14 has been completely opened or completely closed, I have provided opening limit switch 58 and closing limit switch 59. These switches are of the normally closed type and are arranged to be alternately operated by a suitable interlock arm 60 when the grounding switch 14 assumes its extreme positions as will be described in greater detail hereinafter.

Assuming now that the grounding switch 14 is open then, consequently, interlock arm 60 is in its extreme right-hand position as shown in Fig. 2 to cause opening limit switch 58 to assume the open position. Under the above condition closing limit switch 59 will have assumed its closed position. If the cooperating contacts 12 are engaged with the stationary portions 10 of the primary disconnecting contacts and limit switch 18 is closed, grounding switch 14 may be operated to the closed position in the event that the circuit to be grounded is unenergized and the contacts 31, 32 and 33 of potential relays 28, 29 and 30 are closed. The closing of grounding switch 14 may be initiated by depressing closing push button 37, whereupon closing contactor 39 is energized from the positive terminal of the control source of power 17 through normally open contacts 42 of the closing push button 37, the normally closed contacts 41 of the opening push button 36, the contacts 31, 32, and 33, respectively, of potential relays 28, 29, and 30, the normally closed interlock contacts 48 of opening contactor 38, the energizing winding of contactor 39, starting resistor 54, closing limit switch 59, and limit switch 18 to the negative terminal of control power source 17. The energization of closing contactor 39 will close contacts 51, 52, 53, 56, and 57 and open interlock contacts 55. Contacts 52 are seal-in contacts so that, even though closing push button 37 is released, power from the positive terminal of control source 17 now passes through seal-in contacts 52 instead of contacts 42 of closing push button 37. The opening of contacts 55 cuts out the starting resistor 54 while contacts 51, 56, and 57 complete the energizing circuit of motor 16 for the direction of rotation required to close grounding switch 14. This circuit for energizing motor 16 may be traced from the positive terminal of control power source 17 through contacts 51, series field 35, contacts 56, the armature of dynamo-electric machine 16, contacts 57, limit switch 18, to the negative terminal of control power source 17. The shunt field 34 is, of course, energized in parallel with the armature circuit just described. Interlock contacts 55 of contactor 39 are opened at this time to prevent energization of opening contactor 38 as long as closing contactor 39 is energized. During the course of the closing of grounding switch 14, interlock arm 60 is rotated to allow opening limit switch 58 to close and, when grounding switch 14 is completely closed the circuit of closing contactor 39 is interrupted by the operation of closing limit switch 59. The opening of closing limit switch 59 and consequent deenergization of closing contactor 39 interrupts the energizing circuit for motor 16 and closes interlocking contacts 55 so as to prepare the circuit for the opening operation of grounding switch 14.

To open grounding switch 14, it is necessary to depress opening push button 36 whereupon opening contactor 38 is energized from the positive terminal of control power source 17 through the normally open contacts 40 of opening push button 36, the normally closed contacts 43 of closing push button 37, interlocking contacts 55 of closing contactor 39, the energizing winding of contactor 38, starting resistor 47, opening limit switch 58, limit switch 18, to the negative terminal of source 17. Energization of contactor 38 will cause contacts 44, 45, 46, 49, and 50 to be closed while contacts 48 are opened to prevent closing contactor 39 from being energized while opening contactor 38 is energized. The closing of seal-in contacts 45 makes the opening operation of grounding switch 14 automatic from this point on and release of opening push button 36 will have no effect in so far as preventing the completion of the opening operation of the grounding switch. The closing of contacts 46 will shunt starting resistor 47 while the closing of contacts 44, 49, and 50 will cause energization of motor 16 so as to open grounding switch 14, the connections being similar to those completed when closing contactor 39 is energized except that the armature potential of motor 16 is reversed. When grounding switch 14 begins to open, interlock arm 60 allows closing limit switch 59 to close and opens opening limit switch 58 to interrupt the motor circuit through the deenergization of opening contactor 38 when grounding switch 14 reaches its extreme open position.

Although the opening seal-in contacts 45 and the closing seal-in contacts 52 provide automatic control so that the opening push button 36 or the closing push button 37 may be released and the opening or closing operations of grounding switch 14 will, nevertheless, be completed, I have made provision to reverse any operation at the will of the operator before completion thereof. This is accomplished by opening the normally closed contacts of either the opening or closing push button which will immediately stop either the closing or opening operation, respectively and automatically bring grounding switch 14 to its previous position.

The combined testing and grounding apparatus schematically illustrated in Fig. 2 and described above is preferably mounted on a removable unit so as to be readily engageable with the stationary portions 10 of the primary disconnecting contacts mounted in the stationary housing 11 of the metal-clad switchgear. This removable unit as was mentioned above may be either of the vertical lift or draw-out type depending upon the metal-clad switchgear with which it is to be used. In Fig. 1, I have illustrated my invention as embodied in a removable unit generally indicated at 61 which comprises a truck-mounted frame 62 of the same dimension as the removable units comprising the circuit breaker which is removed from the metal-clad switchgear in order to insert my combined test and grounding equipment. Truck-mounted frame 62 is arranged to support contacts 12 which are illustrated in Fig. 1 as adapted to be engaged with the stationary portions of the primary disconnecting contacts of metal-clad switchgear of the vertical lift type. Truck-mounted frame 62 also supports motor 16 and grounding switch 14 which is driven thereby through suitable gearing 63. Although in Fig. 1, I have for the sake of simplification of the drawing illustrated only one pole of grounding switch 14 as being connected to ground, it will be understood by those skilled in the art that a similar connection will be provided for each phase as schematically illustrated in Fig. 2.

The removable unit, generally indicated at 61, embodying my combined testing and grounding device is arranged to be rolled into the metal enclosure 11 so that contacts 12 may engage with the stationary portions 10 of the primary disconnecting contacts, not shown in Fig. 1 when the unit is elevated by means of the elevating mechanism described hereinafter. It will be understood by those skilled in the art that there are usually at least two sets of the stationary portions of the primary disconnecting contacts in metal-clad switchgear which are arranged to be connected to the circuit breaker as is clearly illustrated in the above-mentioned Paxton et al. patent. One of these sets of contacts is usually connected to the bus structure while the other is connected to a feeder or supply circuit. The combined test and grounding equipment of my invention is adapted to test and ground either of these sets of contacts, depending upon which set is engaged with cooperating contacts 12, which, in turn, is dependent upon the position of removable unit 61 in the metal-enclosed housing 11 since the stationary portions of these primary disconnecting contacts usually comprise a front set and a rear set in switchgear of the vertical lift type which are separated by a suitable distance determined entirely by mechanical and electrical considerations.

Engagement of contacts 12 with the stationary contacts supported by housing 11 is accomplished in the vertical lift type of switchgear as illustrated in Fig. 1 by lifting truck-mounted unit 61 vertically, thereby causing engagement of these cooperating plug type contacts. Such vertical movement of removable unit 61 is accomplished by means of a suitable elevating mechanism which is provided on the stationary housing 11 for elevating the vertical lift type of switchgear which is removed when my grounding device is inserted in its place. The elevating mechanism illustrated in Fig. 1 is substantially the same as that disclosed and claimed in the above-mentioned Paxton et al. patent and comprises four jack screws 64 arranged in the form of a rectangle, each jack screw being journaled as at 65 in a cross member 66 of a stationary housing generally indicated at 11. In Fig. 1, I have only shown so much of stationary housing 11 in order to show the elevating mechanism and its cooperation with my combined testing and grounding unit 61. The lower end of each jack screw 64 is mounted in a bearing member 67, which, in turn, is supported on a cross member 68. The pair of jack screws on each side of the frame are arranged to elevate and lower a supporting member 69 for supporting either the circuit breaker or my combined test and grounding unit 61 in a manner well understood by those skilled in the art. Supporting members 69 are arranged to engage the removable unit 61 or the removable circuit breaker as the case may be so that simultaneous and uniform rotation of the jack screws 64 causes corresponding vertical movement of the removable unit. Uniform movement of the jack screws 64 may be obtained in any desirable manner as by the main operating shaft 70 coacting with one pair of jack screws through bevel gearing 71 and with the other pair of jack screws through a sprocket chain 72, countershaft 73, and bevel gearing 74. The portion of shaft 70 extending beyond the frame is illustrated as being provided with a hexagonal portion 75 for cooperation with manual operating means, such as a socket crank, for example. Obviously, shaft 70 may also be motor operated, if desired, and, to this end, I have provided a second shaft 76 arranged to drive shaft 70 through reduction gearing 77. Shaft 76 may be connected through a motor-operated mechanism by any suitable means, not shown.

The elevating mechanism of metal-clad switch-gear of the vertical lift type is usually provided with means for blocking the operation of this elevating mechanism whenever the circuit breaker is in the closed position, at which time it would be very undesirable to allow the primary disconnecting contacts to become either engaged or disengaged. Such an arrangement is also described in the above-mentioned Paxton et al. patent and, as illustrated in Fig. 1, comprises a member 78 pivoted to stationary housing 11 at 79. Member 78 is provided with a suitable extension 80 arranged to engage with a portion of the removable unit when the circuit breaker is in the closed position so that it is impossible to attach a socket crank to the hexagonal end 75 of operating shaft 70 or to operate shaft 76 through a suitable motor-operating mechanism.

As will be understood by those skilled in the art, it is essential when grounding the circuits of metal-clad switchgear by inserting my combined testing and grounding arrangement therein that the contacts 10 and 12 are not engaged or disengaged when the grounding switch 14 is closed. To prevent disengagement of the contacts 10 and 12 when grounding switch 14 is closed, I have provided on removable unit 61 an interlocking arrangement which cooperates with member 78 of the blocking mechanism. To this end, I have provided a horizontally positioned locking bar 81 arranged to be reciprocated horizontally in response to the opening and closing movements of grounding switch 14 by virtue of the pivotally mounted interlocking arm 60 schematically illustrated in Fig. 2 for operating limit switches 58 and 59. Locking bar 81 is provided with a projection 82 which engages with the extension 80 of pivotally mounted member 78, forcing member 78 to assume the position shown in Fig. 1 when grounding switch 14 is closed and interlock arm 60 is rotated in a clockwise direction. When this occurs and locking bar 81 has been moved to the right, member 78 is prevented from being rotated in a clockwise direction so that the hexagonal end 75 of shaft 70 cannot be engaged to operate the elevating mechanism. To prevent engagement of contacts 10 and 12 when grounding switch 14 is closed for some reason or other before unit 61 is inserted in the metal housing 11, I have arranged projection 82 of locking bar 81 so that it will engage with an extension 83 supported by stationary housing 11 thereby to prevent the elevation of unit 61 into its testing and grounding position until the grounding switch is first opened, whereupon projection 82 clears extension 83. From the above description, it is obvious that my combined testing and grounding device embodied in removable unit 61 cannot be moved so as to cause either engagement or disengagement of contacts 12 and the stationary portions of the primary disconnecting contacts 10 supported by the metal enclosure 11 while the grounding switch 14 is closed.

In view of the detailed description included above, the operation of my combined testing and grounding equipment will be obvious to those skilled in the art. With the arrangement described, grounding of the circuits may take place while the operator stands at a distance remote from the circuit being grounded. Furthermore, the circuit must always be tested before it is grounded and a live circuit cannot be grounded. In addition to this, only the circuit tested can be grounded and, hence, I have substantially eliminated all danger to life and property in the grounding of high-voltage circuits.

While I have shown and described my invention as applied to a particular arrangement and as embodying various devices some of which are diagrammatically shown, it will be obvious to those skilled in the art that changes and modifications may be made without departing from my invention and I, therefore, aim in the appended claims to cover all such changes and modifications.

What I claim as new and desire to secure by Letters Patent of the United States is:

1. In electric switchgear of the type including a stationary structure upon which bus circuits and feeder circuits each with separate contacts are mounted and a circuit breaker of the vertical lift type bodily removable with respect to said stationary structure, means for effecting the grounding of said circuits associated with said stationary structure when said circuit breaker has been withdrawn therefrom comprising a grounding unit arranged to be lifted vertically and inserted in place of the withdrawn circuit breaker, said grounding unit having contacts for engagement with said contacts associated with either one of said circuits, a motor-operated grounding switch included in said grounding unit, means for preventing the engagement of the contacts of said grounding unit and the contacts associated with one of said circuits when said grounding switch is in the closed position, means for preventing the disengagement of said contacts when said grounding switch is in the closed position, and means for preventing the operation of said motor-operated grounding switch when said one circuit is energized.

2. In electric switchgear of the type including a stationary structure upon which bus circuits and feeder circuits each with separate contacts are mounted and a circuit breaker bodily removable with respect to said stationary structure, means for effecting the grounding of said circuits associated with said stationary structure when said circuit breaker has been withdrawn therefrom comprising a grounding unit arranged to be inserted in place of the withdrawn circuit breaker, said grounding unit having contacts for engagement with said contacts associated with either one of said circuits, a motor-operated grounding switch included in said grounding unit, means for preventing the engagement of the contacts of said grounding unit and the contacts associated with one of said circuits when said grounding switch is in the closed position, means for preventing the disengagement of said contacts when said grounding switch is in the closed position, means for preventing the operation of said motor-operated grounding switch when said one circuit is energized, and remote control means for controlling the operation of said motor-operated ground switch.

3. In electric switchgear of the type including a stationary structure upon which bus circuits and feeder circuits each with separate contacts are mounted and a circuit breaker bodily removable with respect to said stationary structure, means for effecting the grounding of said circuits associated with said stationary structure when said circuit breaker has been withdrawn therefrom comprising a combined testing and grounding unit arranged to be inserted in place of the withdrawn circuit breaker, said grounding unit having contacts for engagement with said contacts associated with one of said circuits, means for indicating the electrical conditions of said one circuit when said contacts are engaged, means for checking said last-mentioned means, and a motor-operated grounding switch for grounding said one circuit if said one circuit is deenergized.

4. In electric switchgear of the type including a stationary structure upon which bus circuits and feeder circuits each with separate contacts are mounted and a circuit breaker bodily removable with respect to said stationary structure, means for effecting the grounding of said circuits associated with said stationary structure when said circuit breaker has been withdrawn therefrom comprising a grounding unit arranged to be inserted in place of the withdrawn circuit breaker, said grounding unit having contacts for engagement with said contacts associated with either one of said circuits, a motor-operated grounding switch on said unit, a control circuit for said motor, means for rendering said control circuit ineffective until the contacts of said grounding unit are engaged with the contacts of one of said circuits, and means for preventing operation of said motor-operated switch when said one circuit is energized.

WOLDEMAR SPECHT.